United States Patent [19]

Ashida

[11] Patent Number: 4,898,893

[45] Date of Patent: Feb. 6, 1990

[54] BLOWING AGENTS FOR ISOCYANURATE FOAMS AND METHOD FOR PRODUCING THE SAME

[75] Inventor: Kaneyoshi Ashida, Farmington Hills, Mich.

[73] Assignee: Harry A. Fischer, Canada

[21] Appl. No.: 246,877

[22] Filed: Sep. 20, 1988

[51] Int. Cl.$^4$ ............................................. C08G 18/14
[52] U.S. Cl. ........................................ 521/131; 252/69
[58] Field of Search ........................... 252/69; 521/131

[56] References Cited

U.S. PATENT DOCUMENTS 4,482,465 11/1984 Gray ..................................... 252/69

*Primary Examiner*—Maurice J. Welsh
*Attorney, Agent, or Firm*—Arnold S. Weintraub

[57] ABSTRACT

A blend of liquid hydrocarbon and halogenated aliphatic hydrocarbon is used as a blowing agent. The blowing agent is particularly useful to replace chlorofluorocarbons as blowing agents in isocyanate-based foams.

29 claims, 6 Drawing Sheets

BLOWING AGENTS FOR ISOCYANURATE FOAMS AND METHOD FOR PRODUCING THE SAME

BACKGROUND OF THE INVENTION

1. Field of the Invention:

This invention pertains to blowing or foaming agents. More specifically, this invention relates to blowing agents for isocyanate-based foams. Even more particularly, the present invention concerns blowing agents to be used as replacements for chlorofluorocarbon blowing agents.

2. Brief Discussion of the Prior Art:

In the past trichloromonofluoromethane-based blowing agents (CFC's) such as CFC-11 ($CCl_3F$) have been the most desirable blowing agents for isocyanate-based foams, such as rigid and flexible urethane and isocyanurate foams because of its many advantages, such as, low thermal conductivity, non-reactivity, low boiling point, non-flammability, and its non-collapse effect in foam preparation.

In recent years however, it is becoming increasingly obvious that the use of chlorofluorocarbons is depleting the ozone layer in the stratosphere and resulting in serious environmental problems on earth. The use and production of various chlorofluorocarbons is being restricted and thus alternatives are necessary. Alternatives for the chlorofluorocarbon blowing agents have been found in the hydrogen-containing chlorofluorocarbon (HCFC), such as HCFC-123 ($CHCl_2 CF_3$) and hydrocarbon blowing agents.

The HCFC's have relatively short life times in the atmosphere and decompose before they reach the stratosphere. These HCFC compounds, however, present the disadvantages of higher cost and relatively higher thermal conductivity of a foam in which they are used.

Hydrocarbons are flammable and result in flammable foams.

It is therefore desirable to find a new blowing agent as an alternative to HCFC's as well as the CFC's

SUMMARY OF THE INVENTION

The present invention relates to a replacement for chlorinated hydrocarbon blowing agents particularly, chlorofluorocarbons. The blowing agent hereof has particular utility in blowing isocyanate-based foams, such as, rigid and flexible, urethane foams, isocyanurate foams and the like, as well as in other environments where low boiling point physical blowing agents are required.

The blowing agent of the present invention comprises a blend of a (a) liquid hydrocarbon and (b) a halogenated aliphatic hydrocarbon.

The liquid hydrocarbon can comprise any aliphatic, aromatic or alicyclic hydrocarbons and mixtures thereof having a boiling point between about 30° and 100° C. The halogenated aliphatic hydrocarbon may comprise mono and poly-halogenated compounds and mixtures thereof, having a boiling point between about 30° and 100° C.

The liquid hydrocarbon is present in an amount ranging from about 5 to about 30 percent, by weight, based on the total weight of the blowing agent. The halogenated hydrocarbon is present in an amount ranging from about 70 percent to about 95 percent, by weight, based on the total weight of the blowing agent.

The present blowing agent can be used along or in admixture with other blowing agents, such as the CFCS or the HCFC's.

For a more complete understanding of the present invention reference is made to the following detailed description and accompanying examples.

DESCRIPTION OF THE PREFERRED EMBODIMENT

Figure 1:
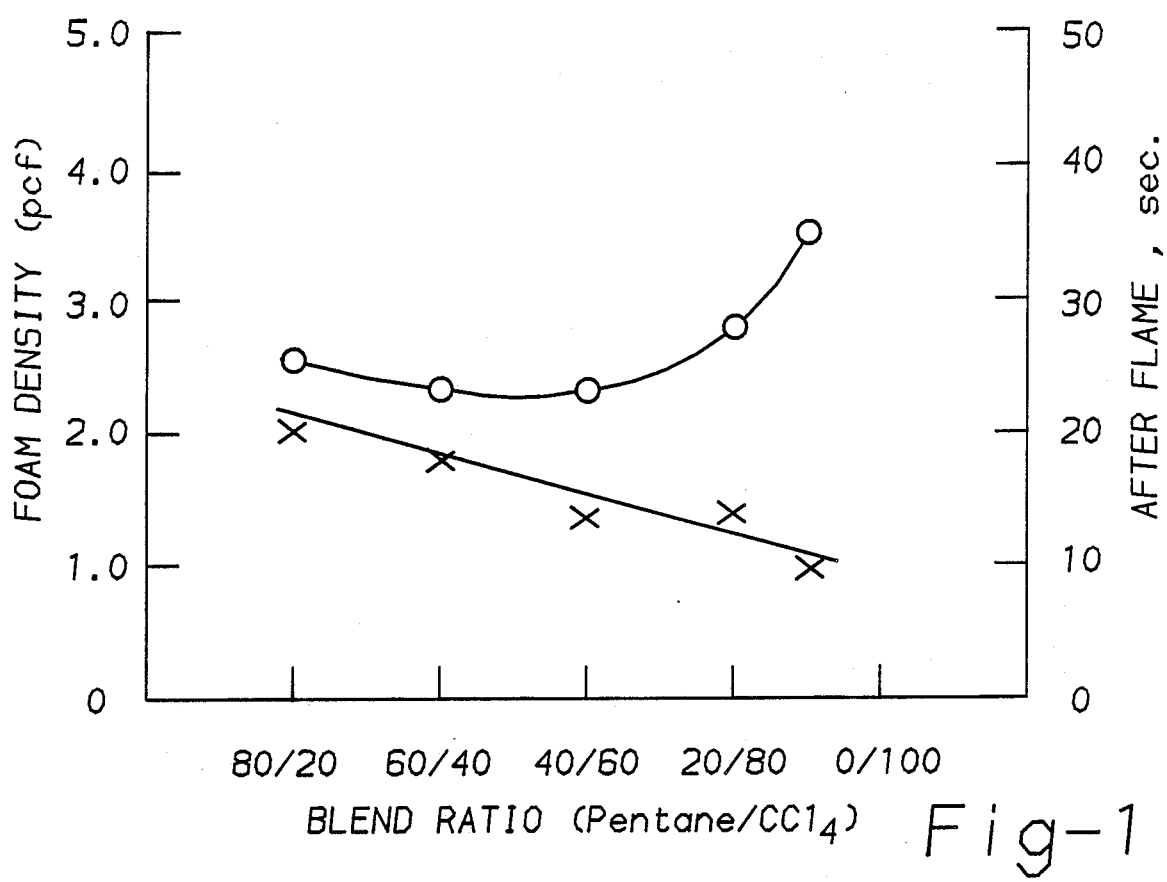
FIG. 1 is a graph showing the effect of blend weight ratios of a pentane-carbon tetrachloride blowing agent on foam density and after flame.

It has been found that a non-fluorinated hydrocarbon may be used as a blowing agent for the formation of an isocyanate-based foam product and the like.

The blowing agent of the present invention comprises:

(a) a liquid hydrocarbon; and
(b) a liquid, non-fluorinated halogenated aliphatic hydrocarbon wherein the blowing agent has a boiling point of between about 30° C. and about 100° C.

The liquid hydrocarbon comprises any aliphatic, aromatic or alicyclic hydrocarbons, or mixtures thereof, preferably, having a boiling point of between about 30° C. and about 100° C. Examples of useful aliphatic hydrocarbons are: n-pentane, i-pentane, n-hexane, heptane, dimethylethylmethane, 2-methylpentane, 23-dimethylbutane, pentene-1, 2-methylbutene, 3-methylbutene, hexene-1 and the like. Useful aromatic hydrocarbons such as benzene, and the like, may also be used. Useful alicyclic hydrocarbons include cyclohexane, and cyclopentane.

In the practice of the present invention, the preferred liquid hydrocarbon is n-pentane.

The halogenated aliphatic hydrocarbon may comprise a mono- or poly-halogenated compound or mixtures thereof having a boiling point of between about 30° C. to about 100° C.

Examples of useful mono-halogenated compounds are: n-propyl chloride, n-propyl bromide, ethyl iodide, isopropyl chloride, isobutyl chloride, t-butyl chloride and t-butyl bromide, and the like, as well as mixtures thereof.

Useful polyhalogenated compounds are: methylene chloride; ethylene bromide; methylene bromide; chloroform; carbon tetrachloride; ethylene dichloride; S-dichloro-acetylene; trichloroethylene, and the like.

In the practice of the present invention the preferred halogenated aliphatic hydrocarbon is methylene chloride, carbon tetrachloride and mixtures thereof. Of course other liquid hydrocarbons and halogenated aliphatic hydrocarbons may be used so long as the overall mixture has a resulting boiling point of between about 30° C. and about 100°.

The blowing agent is prepared by blending together at ambient conditions the hydrocarbon and the halogenated aliphatic hydrocarbon. The resulting blended blowing agent, generally, comprises between about 5 percent and about 30 percent aliphatic, aromatic and alicyclic, hydrocarbons and mixtures thereof and between about 70 percent and about 95 percent by weight of the halogenated aliphatic hydrocarbon and preferably from about 10 to 20 percent by weight of liquid hydrocarbon and about 80 to about 90 percent of halogenated hydrocarbons. The blowing agent hereof has a boiling point of between about 30° C. and about 100° C.

RIGID AND FLEXIBLE URETHANE FORMATION

As noted hereinabove, the blowing agent has particular utility in formation of isocyanate-based foam products such as both rigid and flexible polyurethane foams, isocyanurate foams, urethane-modified isocyanurate foams, oxazalidone-modified isocyanurate foams and the like.

Generally, and as is known to those skilled in the art, flexible and rigid polyurethane foams are prepared by the reaction of an organic polyisocyanate with a polyhydric compound in the presence of a catalyst, a surfactant and a suitable blowing agent.

Useful organic polyisocyanates for the preparation of urethane foams can be represented by the formula:

$$R(NCO)_z$$

wherein R is a polyvalent organic radical selected from the group consisting of aromatic, alkyl aryl and aryl alkyl organic radicals, as well as mixtures thereof; and z is an integer corresponding to the balance number of R and is at least 2. Representative of the organic polyisocyanates contemplated herein include for example, the aromatic diisocyanate, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like. The aromatic triisocyanates such as 4,4',4"-triphenyl methane triisocyanate, the aromatic tetraisocyanates such as 4,4'-dimethyl diphenyl methane-2,2',5,5'-tetraisocyanate, and the like; aralkyl polyisocyanates, such as xylylene diisocyanate; aliphatic polyisocyanates, such as hexamethylene-1,6-diisocyanate, licing diisocyanate methyl ester, isophorone diisocyanate, 2,4,4-trimethylhexamethylene-1,6-diisocyanate and the like, and the mixtures thereof. Other useful organic polyisocyanates include hydrogenated methylene, diphenyl isocyanate, m-phenylene diisocyanate, napthalene-1,5-diisocyanate, 1-methoxyphenyl-2,4-diisocyanate, 4,4' biphenylene diisocyanate, 3,3'dimethyl-4,4'-biphenyl diisocyanate, 3,3'-dimethyl-4,4'-biphenyl diisocyanate, and 3,3'-dimethyl diphenyl methane-4,4' diisocyanate, and the like.

These polyisocyanates are prepared by conventional methods in the art such as phosgenation of the corresponding organic amine.

Still another class of organic polyisocyanates useful herein are isocyanate terminated quasi-prepolymers. These quasi-prepolymers are prepared by reacting excess organic polyisocyanate or mixtures thereof with a minor amount of an active hydrogen-containing compound. Suitable active hydrogen containing compounds for preparing the quasi-prepolymers hereof are those containing at least two active hydrogen-containing groups which are isocyanate reactive. Typifying such compounds are hydroxyl-containing polyesters, polyalkylene ether polyols, hydroxyl-terminated polyurethane oligomies, polyhydric polythioethers, ethylene oxide adducts of phosphorous-containing acids, polyacetals, aliphatic polyols, aliphatic thiols including alkane, alkene and alkyne thiols having two or more-SH groups; as well as mixtures thereof. Compounds which contain two or more different groups within the above-defined classes may also be used such as, for example, compounds which contain both an SH group and an OH group.

Still another class of useful polyisocyanate are carbodiimide-modified MDI; allophanate-modified TDI, urea-modified TDI, as well as oxazolidone-modified TDI.

Aliphatic polyisocyanates, generally, are not suited for use herein because of their slow reaction rates.

Among the useful polyhydric compounds are both polyester and polyether polyols.

Any suitable hydroxyl-containing polyester may be used such as are obtained, for example, from polycarboxylic acids and polyhydric alcohols. Any suitable polycarboxylic acid may be used as oxalic acid, malonic acid, succinic acid, glutaric acid, as well as other polycarboxylic acids and mixtures thereof. A suitable polyhydric alcohol including both aliphatic and aromatic hydrocarbons may be used, such as ethylene glycol, 1,3-propylene glycol, 1,4-pentane diol as well as other polyhydric alcohols and mixtures thereof. Also included with the term "polyhydric alcohol" are compounds derived from phenol such as 2,2-bis(4-hydroxyphenol) propane, commonly known as bis phenol A. Other types of useful polyesters include lactone-based polyesters, such as those prepared by the ring-opening polymerization of lactones, e.g. E-caprolactone.

Any suitable polyalkylene polyether polyol may be used, such as the polymerization product of an alkylene oxide with a polyhydric alcohol. Any suitable polyhydric alcohol may be used such as those disclosed above for use in the preparation of hydroxyl-containing polyesters. Any suitable alkylene oxide may be used such as ethylene oxide, propylene oxide, butylene oxide, amylene oxide, and hyteric or block copolymers of these oxides. The polyalkylene polyether polyols may be prepared from other starting materials such as tetrahydrafuran and alkylene oxide, tetrahydrafuran blends; epihalohydrins such as epichlorohydrin; as well as aralkylene oxides such as styrene oxide.

Any suitable polyhydric polythioether may be used such as, for example, the condensation products of thiodiglycol or the reaction product of dihydric alcohol such as is disclosed above for the preparation of the hydroxy-containing polyesters with any other suitable thioether glycol.

The hydroxyl-containing polyester may also be a polyester amide such as is obtained by including some amine or amino alcohol and their reactants for the preparation of the polyesters.

Alkylene oxide adducts of acids of sulfuric acid and phosphoric acid which may be used include those neutral adducts prepared from the alkylene oxides disclosed above for use in the preparation of polyalkylene polyether polyol.

Any suitable aliphatic thiol including alkene thiols containing at least 2-SH groups may be used such as 1,2-ethane dithiol, 1,2-propane dithiol, and alkene thiols such as 2-butene-1,4-dithiol and alkyne thiols such as 3-hexyne-1,6-dithiol.

Other compounds which do not necessarily fit within any of the previously set forth classes of compounds which are quite suitable in the production of these other quasi-prepolymer compounds include the hydroxy-terminated polyurethane polymers such as hydrox-terminated polymer made by reacting the isocyanate with several moles of an alkylene glycol.

Polymeric polyols such as those which are prepared by grafting styrene and/or acrylonitrile polyether polyols can also be used, as well as polyurea dispersion polyols. The present invention employs a polyether polyol sold under the trade name Pluracol TP-440 available from BASF.

In use herein, it is preferred that the isocyanate have an isocyanate index of from about 90 to about 120 for both flexible and rigid polyurethane foams for making rigid polyurethane foams. The preferred isocyanate utilized in the present invention is polymeric isocyanate sold by Dow Chemical under the trade name PAPI-27. In making flexible foams it is preferred to toluene diisocyanate an 80:20 mixture of 2,4- and 2,6-toluene diisocyanate, carbodiimide-modified MDI, MDI-prepolymers.

The catalysts employed herein are conventional catalysts used for making polyurethane foam. The catalysts include both tin catalysts and tertiary amine catalysts. Representative tin catalysts are dibutyl tin dilaurate and stannous octoate. Commonly used tertiary amine catalysts include N-methylmorphorine, N,NN'N'-tetramethylpropylene diamine, 1,4-diazabicyclo[2,2,2]octane, (DABCO), dimethylaminoethylether, 1,8-diazabicyclo[5,4,0]undecene-7 and its salt such as the phenol salt, 2-ethylhexanoate acid salt and the like. The catalyst is employed in catalytic amounts ranging from about 1 to 5 parts by weight thereof per 100 parts by weight of polyhydric compound.

The flexible urethane foams are usually prepared at ambient conditions by adding the polyol, catalyst, surfactant, blowing agent, a minor amount of water and flame retardant.

In preparing rigid polyurethane foams, water, as a blowing agent, is usually eliminated as an ingredient, to preclude the liberation of carbon dioxide.

The surfactant may be chosen from any of those surfactants commonly used for preparing rigid polyurethane foams, such as polymethyl siloxane-polyoxyalkylene block copolymers and the like. These products are commercially available in the market and known to the skilled artisan. The surfactant is employed in an amount ranging from about 0.1 to 3 percent by weight based on weight of the isocyanate. Usually the amount is in a range of about 1 to 2 percent by weight. Representative of this type of surfactant are those sold commercially by Dow Corning under the name DC-193 and the like.

In preparing flexible and rigid urethane foams, the blowing agent of the present invention is employed in an amount ranging from about 1 to 30 percent by weight based on the weight of the isocyanate present in the foam formulations. The preferred amount of blowing agent for low density is between about 15 to about 20 percent by weight based on total weight of the polyol employed. The amount of blowing agent employed is chosen based on the foam density required. Use of the blowing agent results in a low density urethane foam with excellent flame retardance. Problems of foam collapse and sigh phenomena are avoided with the use of the blended blowing agent of the present invention.

ISOCYANURATE FOAM FORMATION

Isocyanurate foams are prepared, generally, by the catalytic trimerization of an organic polyisocyanate such as those set forth hereinabove. Ordinarily, modifiers such as a polyol of the type hereinabove described, a silicone surfactant, a blowing agent and the like are included in the foam formulation.

Useful trimerization catalyst for the isocyanurate foams has the given formula:

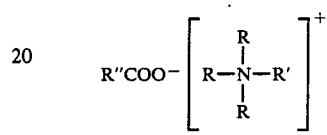

wherein R is a hydrocarbon radical selected from the group consisting of methyl functional groups, ethyl functional groups and mixtures thereof, R' is an alcohol radical having between about 2 and about 3 carbon atoms, and R" is either hydrogen or hydrocarbon radical having an alkyl group with between 1 and about 8 carbon atoms.

The catalyst is, preferably, selected from the group consisting of trimethyl hydroxy propyl ammonium carboxylate, such as trimethyl hydroxy propyl ammonium formate, trimethyl hydroxypropyl ammonium, 2-ethyl hexanoate, and mixtures thereof. The latter two catalysts are commercially available from Air Products, Inc. under the trade names DABCO TMR and DABCO TMR-2, respectively. Although the monocarboxylate catalyst is preferred, ammonium dicarboxylate catalysts can be used as well. The use of this catalyst is disclosed in copending U.S. patent application Ser. No. 07/069,502. The method for producing such foams is set forth in pending U.S. patent application Ser. No. 07/069,502. Of course other trimerization catalysts such as those disclosed in the proceedings of SPI-urethane conferences, Toronto, Canada, 1986 by the present inventor and entitled "Novel Catalysts for Isocyanate Reactions", the disclosure of which is hereby incorporated by reference. Other disclosure of useful trimerization catalysts and methods of producing isocyanurate foams prepared therefrom can be found in U.S. Pat. Nos. 3,931,065 and 3,621,872 as well as in publications, such as, A.A.R. Sayigh, Advances in Urethane Sciences and Technology, v. 3, pp. 141-164 (1974) edited by K. C. Frisch and S. L. Reegen, "Technomic Publishing Co., H. E. Reymore, et al, J. Cellular Plastics, v. 14, pp. 332-340 (1978), the disclosures of which are hereby incorporated by reference.

Ordinarily, the catalyst is employed in effective weight amounts ranging from about 0.1 to 5.0 percent by weight of isocyanate and preferably about 1 to 2 parts.

The blowing agent of the present invention is employed in an amount ranging from about 1 to about 30 percent by weight based on the weight of the isocyanate present in the isocyanurate foam formulation. The preferred amount is between about 15 and 20 percent by weight based on total isocyanate weight. The amount is chosen based on the foam densities required. Use of the blended blowing agent results in a low density isocyanurate foam with excellent flame retardance. The problems of foam collapse and sigh phenomena of rising foam are avoided by the blowing agent of the present invention.

It should be noted that while the blended physical blowing agent hereof is efficacious when used, alone, it can be used when admixed with other liquid blowing agents, when the overall liquid has a boiling point between about 30° C. and about 100° C.

Thus, in the formation of isocyanate-based foams the present invention can be blended with chlorofluorocarbons, hydrogen-containing chlorofluorocarbons as well as mixtures thereof. When blended with these other blowing agents any desired variations of composition can be used ranging from about 1 percent by weight of the blend up to about 99 percent by weight of the blend and anywhere in between. A particular advantage that is herein realized is that by blending together the blowing agent hereof with a HCFC blowing agent, it is possible to form an isocyanurate foam with an HCFC-based blowing agent.

Heretofore isocyanurate foams were not blown with an HCFC blowing agents.

For a more complete understanding of the present invention reference is made to the following illustrative examples. In the Examples, all parts are by weight absent indications to the contrary.

EXAMPLE I

This example provides a comparison between the use of the present blend versus the use of the single components, alone.

A series of one-shot isocyanurate foams were prepared by mixing together, at ambient conditions, an organic polyisocyanate, a surfactant, a polyol, and an isocyanate trimerization. The ingredients and the amounts thereof are set forth in Table I, along with the physical properties of the resulting foam.

It can be seen from the data that pentane, alone, which is flammable, gave a low density, fine cell foam, which had poor Butler Chimney flammability; high after flame. Methylene chloride and chloroform, alone, gave collapsed foams. In addition HCFC-123, alone, proved to be the same as CFC-11.

TABLE 1

| COMPARISON OF SINGLE SOLVENTS | | | | | | |
|---|---|---|---|---|---|---|
| Ingredient, pbw | 246-1 | 246-2 | 246-3 | 246-4 | 246-5 | 246-6 |
| PAPI-580 (Pts/wt)[1] | 100 | 100 | 100 | 100 | 100 | 100 |
| Pluracol TP 440[2] | 6.6 | 6.6 | 6.6 | 6.6 | 6.6 | 6.6 |
| Pentane | 18 | 18 | 18 | 0 | 0 | 0 |
| HCFC-123 | 0 | 0 | 0 | 18 | 0 | 0 |
| $C_2HCl_3$ | 0 | 0 | 0 | 0 | 18 | 0 |
| $CHCl_3$ | 0 | 0 | 0 | 0 | 0 | 18 |
| DC-193[3] | 1.5 | 1.5 | 1.5 | 1.5 | 1.5 | 1.5 |
| Dabco TMR[4] | 1.0 | 1.5 | 3.5 | 1.5 | 1.5 | 3.0 |
| Processing | | | | | | |
| Cream Time, sec. | 30" | 28" | 15" | 18" | 45" | 25" |
| Rise Time, sec. | 3'20" | 3' | 45" | 35" | 1'20" | 50" |
| Tack Time, sec. | 11' | 7' | 1'30" | 1'20" | 1'50" | 60" |
| Properties | | | | | | |
| Foam Density, pcf. kg/cu.m | 2.1 | 2.1 | 1.6 | 2.5 | collapse | collapse |
| Butler Chimney % wt. retained | 54 | 62 | 52 | 86 | | |
| After Flame, sec. | 18 | 21 | 20 | 6 | | |

[1] a polymeric isocyanate (Eq. wt. 139) from Dow Chemical
[2] a polyether polyol (Eq. wt. 138) available from BASF Corporation
[3] a silicone surfactant from Dow Corning
[4] a trimerization catalyst available from Air Products

EXAMPLE II

This example illustrates the preparation of an isocyanurate foam in accordance with the present invention.

Following the procedure of Example I a series of isocyanurate foams were prepared by mixing together an organic polyisocyanate, a polyether polyol, a catalyst, a surfactant and various pentane-carbon tetrachloride blends as a blowing agent.

Table 2 sets forth the ingredients, their amounts and their resulting physical properties. FIG. 1 shows the relationship between the blend ratios and their effects on foam density and after flame.

As can be seen from the data each blend gave a fine cell foam and as the amount of $CCl_4$ increased there was a higher Butler Chimney weight retention and shorter after flame time, without any flammability of the blend due to the high chlorine content.

TABLE 2

| | BLENDS OF PENTANE/$CCl_4$ | | | | | |
|---|---|---|---|---|---|---|
| Ingredient, pbw | 246-15 | 246-16 | 246-17 | 246-18 | 246-19 | 246-35 |
| PAPI 580 | 100 | 100 | 100 | 100 | 100 | 100 |
| Pluracol TP 440 | 6.6 | 6.6 | 6.6 | 6.6 | 6.6 | 6.6 |
| Pentane/$CCL_4$ | 80/20 | 60/40 | 40/60 | 20/80 | 10/90 | 5/95 |
| Pentane, g. | 14.4 | 10.8 | 7.2 | 3.6 | 1.8 | 0.9· |
| $CCl_4$, g | 3.6 | 7.2 | 10.8 | 14.4 | 16.2 | 17.1 |
| DC-193 | 1.5 | 1.5 | 1.5 | 1.5 | 1.5 | 1.5 |
| Dabco TMR | 3.2 | 3.0 | 3.0 | 3.2 | 2.5 | 3.0 |
| Equivalent Ratio NCO/OH | 15 | 15 | 15 | 15 | 15 | 15 |
| Processing | | | | | | |
| Cream Time, sec. | 15" | 15" | 15" | 14" | 17" | 15" |
| Rise Time, sec. | 50" | 50" | 60" | 50" | 40" | 45" |
| Tack Free Time, sec. | 60" | 65" | 70" | 55" | 45" | 45" |
| Properties | | | | | | |
| Density, pcf. | 2.4 | 2.3 | 2.3 | 2.7 | 3.4 | 3.2 |
| Butler Chimney % wt. retained | 72 | 81 | 58 | 70 | 77 | NA |
| After Flame, | | | | | | |

TABLE 2-continued

| | BLENDS OF PENTANE/CCl₄ | | | | | |
|---|---|---|---|---|---|---|
| Ingredient, pbw | 246-15 | 246-16 | 246-17 | 246-18 | 246-19 | 246-35 |
| sec. | 20 | 18 | 13 | 13 | 9 | NA |

EXAMPLE III

The procedure of Example I was repeated but using a series of pentane/methylene chloride blends as the blowing agent. Table 3 sets forth the ingredients, their amounts and the resulting physical properties.

Figure 2:
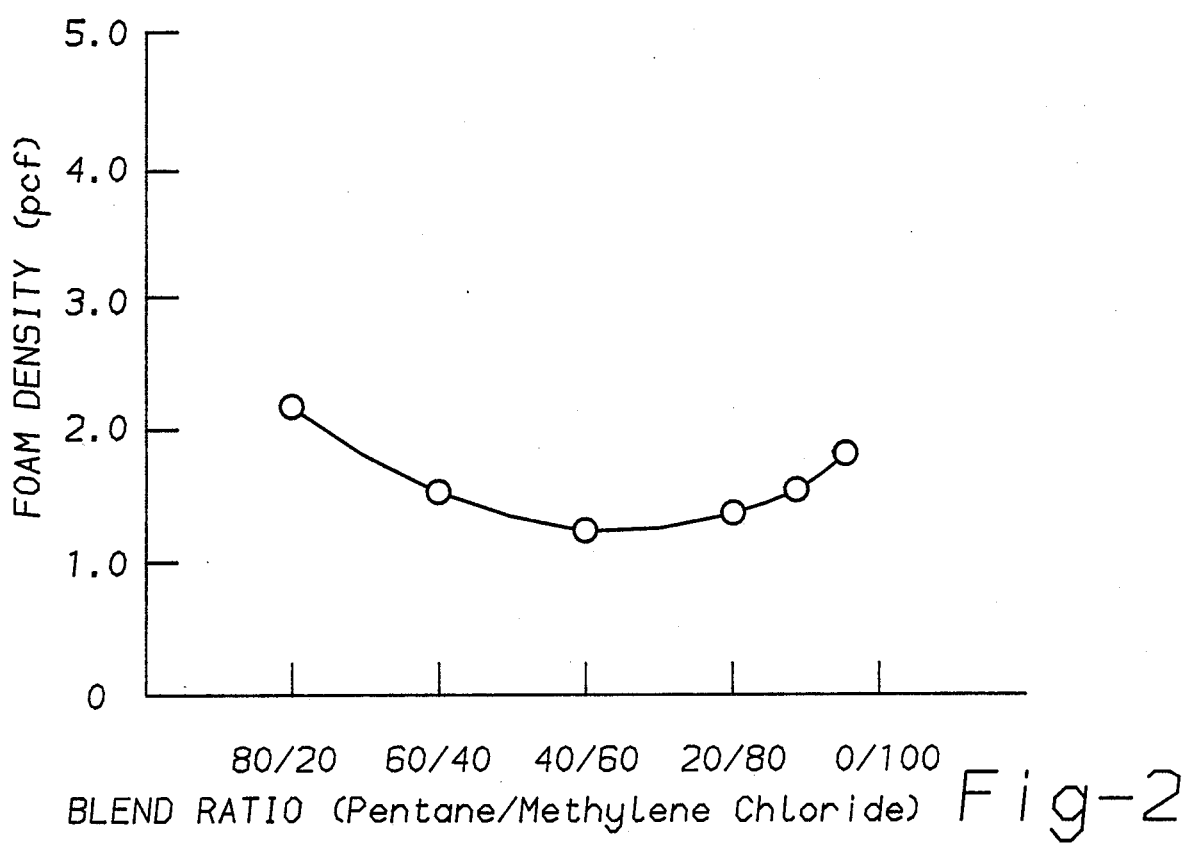
FIG. 2 is a graph showing the effect of blend weight ratios of a pentane-methylene chloride blowing agent on foam density.
Figure 5:
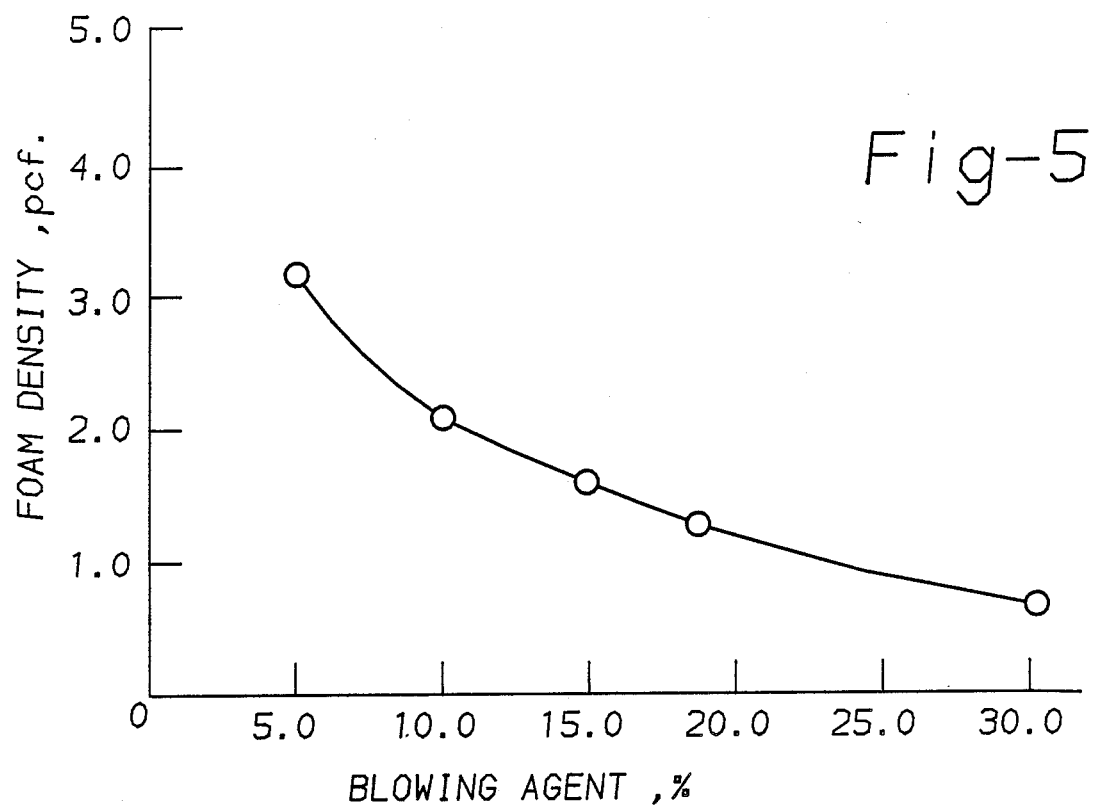
FIG. 5 is a graph showing the effect of a 20/80 weight ratio pentane-methylene chloride blowing agent blend on foam density.

FIG. 2 plots the increased amount of methylene chloride versus foam density. The low density effect is shown only to the point of 90 percent methylene chloride content, and above this point the foam densities increase due to the solubility effect of methylene chloride. Optimum low foam density was achieved at a 20/80 weight ratio of pentane/methylene chloride with five cell foams, no collapse and no sigh phenomena. The higher chlorine content again, results in improved flame retardance. Table VII and FIG. 5 show the 80/20 blend on the resulting foams.

EXAMPLE IV

Figure 3:
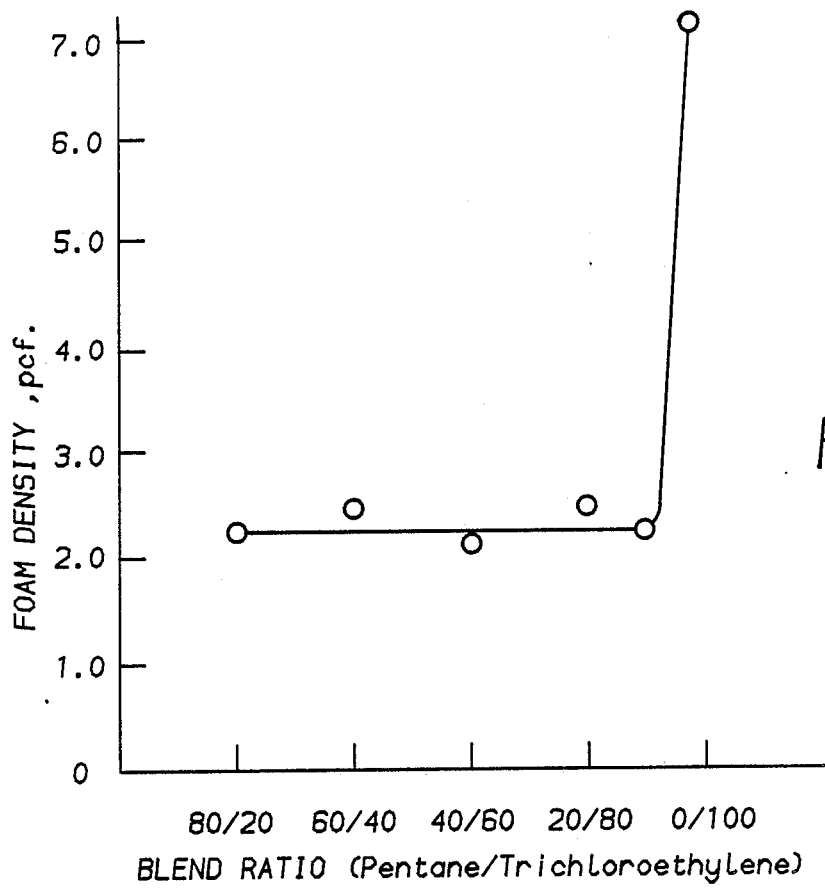
FIG. 3 is a graph showing the effect of blend weight ratios of a pentane-trichloroethylene blowing agent on foam density.

Following the procedure of Example I a series of isocyanurate foams were prepared using a series of pentane-trichloroethylene blends as the blowing agent. As shown in Table 4 and FIG. 3, at blend ratios of pentane to trichloroethylene greater than 10/90, there were high density or collapsed foams. Within the preferred range no sign phenomena and no collapse was observed.

Table 5 sets forth the ingredients, their amounts and the resulting physical properties.

TABLE 4

| | BLEND OF PENTANE/TRICHLOROETHYLENE | | | | | |
|---|---|---|---|---|---|---|
| Ingredient, pbw | 246-24 | 246-25 | 246-26 | 246-27 | 246-33 | 246-37 |
| PAPI 580 | 100 | 100 | 100 | 100 | 100 | 100 |
| Pluracol TP 440 | 6.6 | 6.6 | 6.6 | 6.6 | 6.6 | 6.6 |
| Pentane/Trichloroethylene | 80/20 | 60/40 | 40/60 | 20/80 | 10/90 | 5/95 |
| Pentane | 14.4 | 10.8 | 7.2 | 3.6 | 1.8 | 0.9 |
| Trichloethylene | 3.6 | 7.2 | 10.8 | 14.4 | 16.2 | 17.1 |
| DC 193 | 1.5 | 1.5 | 1.5 | 1.5 | 1.5 | 1.5 |
| Dabco TMR | 3.0 | 3.0 | 3.3 | 3.0 | 3.0 | 3.0 |
| Processing | | | | | | |
| Cream Time, sec. | 16″ | 14″ | 13″ | 13″ | 18″ | 15″ |
| Rise Time, sec. | 45″ | 40″ | 35″ | 30″ | 55″ | 35″ |
| Tack Free Time, sec. | 60″ | 45″ | 38″ | 32″ | 55″ | 35″ |
| Density, pcf. | 2.3 | 2.5 | 2.1 | 2.5 | 2.3 | 7.2 |

EXAMPLE V

Figure 4:
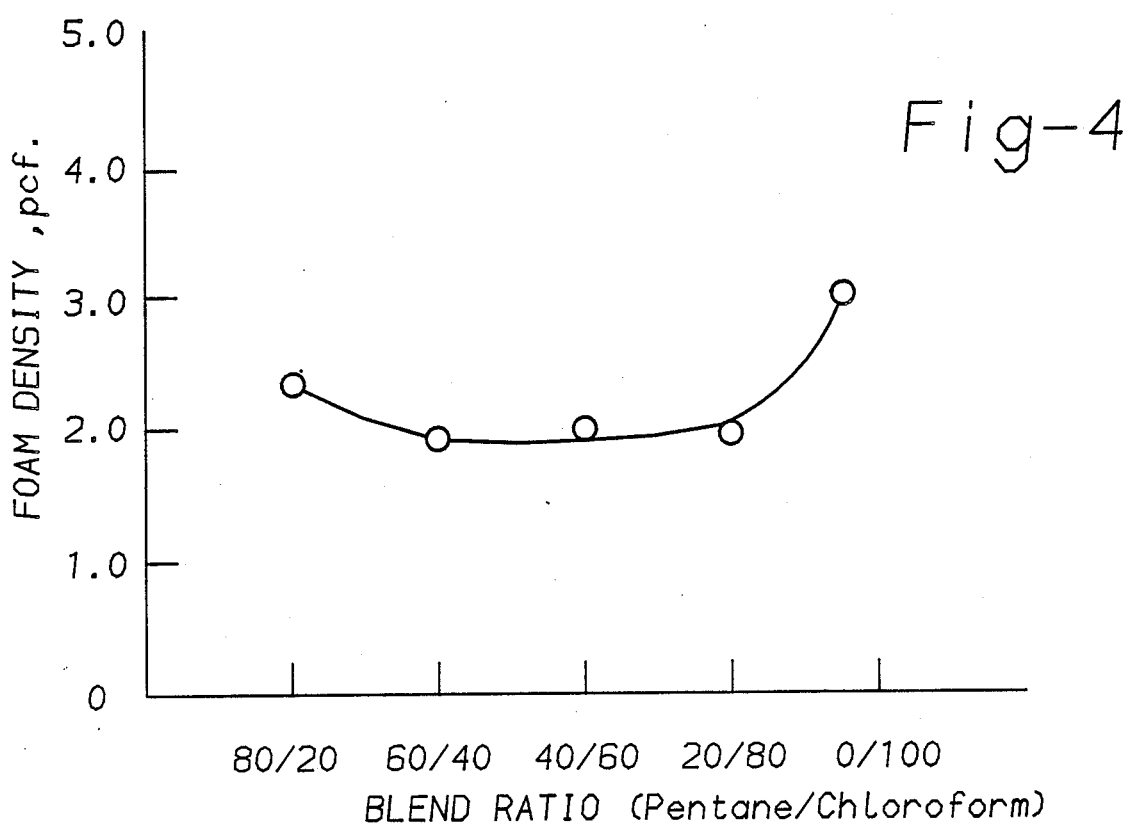
FIG. 4 is a graph showing the effect of blend weight ratios of a pentane-chloroform blowing agent on foam density.

Example I was repeated using a third series of blended blowing agents comprising a pentane/chloroform blend. Low density foams were obtained using up to 80 percent chloroform. Then pentane/chloroform blend and its effects on the foam density are shown in FIG. 4. The foam composition using this blowing agent blend is tabulated in Table 6. As can be

TABLE 3

| | BLEND OF PENTANE/METHYLENE CHLORIDE | | | | | |
|---|---|---|---|---|---|---|
| Ingredient, pbw | 246-20 | 246-21 | 246-22 | 246-23 | 246-32 | 246-36 |
| PAPI 580 | 100 | 100 | 100 | 100 | 100 | 100 |
| Pluracol TP 440, | 6.6 | 6.6 | 6.6 | 6.6 | 6.6 | 6.6 |
| Pentane/CH₂Cl₂ | 80/20 | 60/40 | 40/60 | 20/80 | 10/90 | 5/95 |
| CH₂Cl₂, | 3.6 | 7.2 | 10.8 | 14.4 | 16.2 | 17.1 |
| Pentane | 16.4 | 12.8 | 7.2 | 3.6 | 1.8 | 0.9 |
| DC-193 | 1.5 | 1.5 | 1.5 | 1.5 | 1.5 | 1.5 |
| Dabco TMR, | 2.5 | 3.0 | 3.0 | 3.0 | 3.0 | 3.0 |
| Processing | | | | | | |
| Cream Time, sec. | 70″ | 15″ | 13″ | 11″ | 16″ | 14″ |
| Rise Time, min/min/sec. | 3′10″ | 1′30″ | 1′15″ | 1′05″ | 1′20″ | 35″ |
| Tack Free Time, min/sec. | 8′ | 2′30″ | 1′30″ | 1′20″ | 1′20″ | 35″ |
| Properties | | | | | | |
| Density, pcf. | 2.2 | 1.5 | 1.3 | 1.3 | 1.4 | 1.7 |
| Butler Chimney | | | | | | |
| % wt. retained | | | | | | 63 |
| After Flame, sec. | | | | | | 12 | seen from Table 5, when as little as 5 parts of pentane is added to the chloroform there results a five cell foam having excellent flame retardance as determined by the Butler Chimney test.

TABLE 5

| | BLEND OF PENTANE/CHLOROFORM | | | | | |
|---|---|---|---|---|---|---|
| Ingredient, pbw | 246-28 | 246-29 | 246-30 | 246-31 | 216-35 | 246-38 |
| PAPI 580 | 100 | 100 | 100 | 100 | 100 | 100 |
| Pluracol TP 440 | 6.6 | 6.6 | 6.6 | 6.6 | 6.6 | 6.6 |
| Pentane/Chloroform | 80/20 | 60/40 | 40/60 | 20/80 | 10/90 | 5/95 |
| Pentane | 14.4 | 10.8 | 7.2 | 3.6 | 1.8 | 0.9 |
| Chloroform | 3.6 | 7.2 | 10.8 | 14.4 | 16.2 | 17.1 |
| DC-198 | 1.5 | 1.5 | 1.5 | 1.5 | 1.5 | 1.5 |
| Dabco TMR | 3.0 | 3.3 | 3.0 | 3.0 | 3.0 | 3.0 |
| Processing | | | | | | |
| Cream Time, sec. | 15" | 14" | 13" | 13" | 17" | 15" |
| Rise Time, sec. | 70" | 48" | 60" | 48" | 75" | 37" |
| Tack Free Time, sec. | 75" | 50" | 60" | 50" | 5" | 37" |
| Properties | | | | | | |
| Density, pcf. | 2.3 | 1.9 | 2.0 | 1.9 | 1.5 | 3.0 |
| Butler Chimney % wt. retained | | | | | | 85 |
| After Flame, sec. | | | | | | 3 |

EXAMPLE VI

This example illustrates the effects of foam density in isocyanurate foams by varying the amounts of blowing agent, by using the foam formulation 246-32, as set forth in Table 4.

Foam densities were varied from 1.1 pcf to 3.2 pcf.

The result of this example are set forth in Table 6 and FIG. 5.

As can be seen from the data there is provided very low density foams without any sign phenomena or collapse.

TABLE 6

| EFFECT OF DENSITY ON BUTLER CHIMNEY FLAMMABILITY | | | | | |
|---|---|---|---|---|---|
| Ingredient, pbw | 246-23 | 246-23-a | 246-23-b | 246-23-c | 246-23-d |
| PAPI 580 | 100 | 100 | 100 | 100 | 100 |
| Pluracol TP 440 | 6.6 | 6.6 | 6.6 | 6.6 | 6.6 |
| Pentane/Methylene chloride, weight ratio | 20/80 | 20/80 | 20/80 | 20/80 | 20/80 |
| Pentane | 3.6 | 1.0 | 2.0 | 3.0 | 6.0 |
| Methylene Chloride | 14.4 | 4.0 | 8.0 | 12.0 | 24.0 |
| DC 193 | 1.5 | 1.5 | 1.5 | 1.5 | 1.5 |
| Dabco TMR | 2.5 | 3.0 | 3.0 | 3.0 | 3.0 |
| % Blowing Agent/PAPI | 18 | 5 | 10 | 15 | 30 |
| Processing | | | | | |
| Cream Time, sec. | 11" | 13 | 14 | 16 | 17 |
| Rise Time, sec. | 65" | 42 | 60 | 74 | 64 |
| Tack Free Time, sec. | 80 | 42 | 60 | 74 | 64 |
| Properties | | | | | |
| Density, pcf. | 1.3 | 3.2 | 2.1 | 1.6 | 1.1 |
| Butler Chimney % wt. retained | | 81.5 | | | |

EXAMPLE VII

Figure 6:
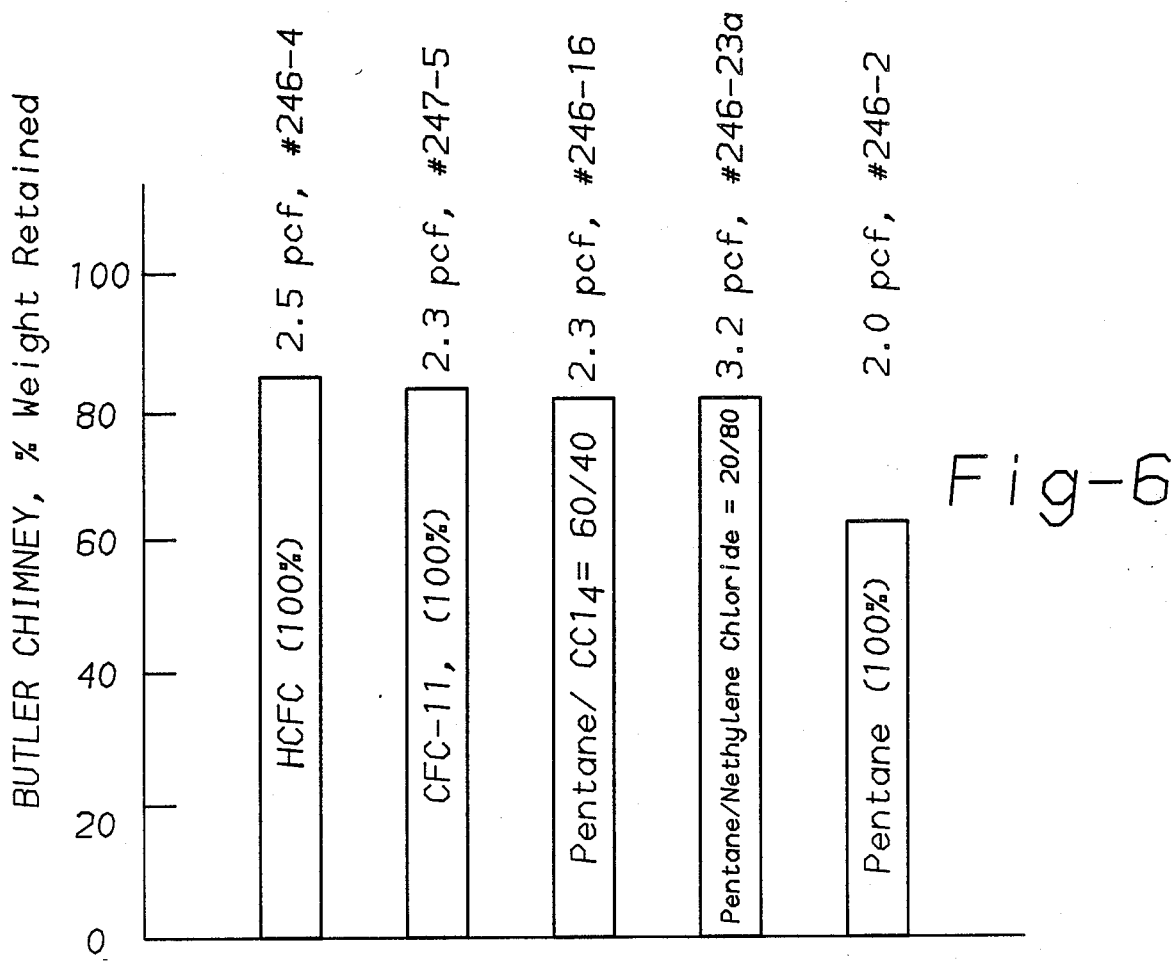
FIG. 6 is a chart showing a comparison of modified isocyanurate foams prepared by using various blowing agents.

Using various foam formulations set forth hereinbefore, a comparison of Butler Chimney Flammability results were plotted versus various blowing agents. FIG. 6 sets forth the results.

It can, thus, be seen that the use of the present invention gives the same flame retardance as that obtained by using CFC-11 or HCFC-123.

EXAMPLE VIII

This example illustrates the preparation of a rigid urethane foam in accordance with the present invention.

A rigid polyurethane foam was prepared by mixing together a polyether polyol, an organic polyisocyanate, a silicone surfactant and a urethane catalyst in the presence of varying blends of a methylene chloride/pentane blowing agent.

Table 7 sets forth the ingredients, the amounts and the resulting physical properties.

As can be seen, fine cell, low density foams were obtained hereby.

TABLE 7

| RIGID URETHANE FOAMS | | | | | |
|---|---|---|---|---|---|
| Ingredient, pbw | 101 | 102 | 103 | 104 | 105 |
| Voranol 360[1] | 100 | 100 | 100 | 100 | 100 |
| DC-193 | 1.5 | 1.5 | 1.5 | 1.5 | 1.5 |
| Dabco 33LV[2] | 2.0 | 2.0 | 2.0 | 2.0 | 2.0 |
| Dabco T-12[3] | 0.3 | 0.3 | 0.3 | 0.3 | 0.3 |
| $CH_2Cl_2$ | 22.4 | 19.6 | 16.8 | 14.0 | 28 |
| Pentane | 5.6 | 8.4 | 11.2 | 14.0 | 0 |
| Ratio, $CH_2Cl_2$/Pentane | 80/20 | 70/30 | 60/40 | 50/50 | 100/0 |
| PAPI 27[4] | 105 | 105 | 105 | 105 | 105 |
| Processing | | | | | |
| Cream Time, sec. | 26 | 25 | 29 | 23 | 26 |
| Rise time, sec. | 60 | 64 | 80 | 75 | 45 |
| Tack Free Time, sec. | 60 | 64 | 80 | 75 | 45 |
| Properties | | | | | |

TABLE 7-continued

| | RIGID URETHANE FOAMS | | | | |
|---|---|---|---|---|---|
| Ingredient, pbw | 101 | 102 | 103 | 104 | 105 |
| Density, pcf. | 2.72 | 2.67 | 2.37 | 2.31 | NA |
| Appearance (Number of cracks) | many | some | no | no | |

(1) a polyether polyol having an equiv. wt. of 156 from Dow Chemical
(2) a t-amine catalyst from Air Products
(3) dibutyltin dilaurate
(4) a polymeric isocyanate (Eq. wt. 140) from Dow Chemical

EXAMPLE IX

This example illustrates the use of a pentane/methylene chloride blend as a blowing agent for a flexible polyurethane foam.

A series of flexible polyurethane foams were prepared from an organic polyisocyanate, a polyether polyol, a surfactant, a catalyst, water and varying amounts of a blowing agent in accordance with the present invention. Table 8 sets forth the ingredients, the amounts thereof and the resulting physical properties.

As can be seen from the data foams comparable to those obtained using CFC-11 as a blowing agent resulted.

TABLE 8

| | FLEXIBLE URETHANE FOAMS | | | | |
|---|---|---|---|---|---|
| Formulation (g) | 201 | 202 | 203 | 204 | 205 |
| Pluracol 726(1) | 100 | 100 | 100 | 100 | 100 |
| Water | 2.0 | 2.0 | 2.0 | 2.0 | 2.0 |
| Dabco T-12 | 0.05 | 0.05 | 0.05 | 0.05 | 0.05 |
| A-1(2) | 0.15 | 0.15 | 0.15 | 0.15 | 0.15 |
| DC-190(3) | 2.0 | 2.0 | 2.0 | 2.0 | 2.0 |
| CFC-11 | 5.0 | 0 | 0 | 0 | 0 |
| $CH_2Cl_2$ | 0 | 4 | 8 | 16 | 10 |
| Pentane | 0 | 1 | 2 | 4 | 0 |
| Isonate 143L(4) | 49.2 | 49.2 | 49.2 | 49.2 | 49.2 |
| Processing | | | | | |
| Cream Time, sec | 20 | 20 | 20 | 20 | 20 |
| Rise Time, sec. | 60 | 80 | 90 | 105 | 90 |
| Tack Free Time, sec. | 180 | 200 | 220 | 300 | 180 |
| Property | | | | | |
| Density, pcf. | 4.22 | 5.15 | 5.32 | 6.25 | 6.07 |

(1) a polyether polyol available from BASF Corp. and having an equivalent wt. of 1,000.
(2) a t-amine catalyst from Union Carbide
(3) a silicone surfactant available from Dow Corning
(4) a carbodiimide-modified MDI having an equivalent wt. of 144 available from Dow Chemical

I claim:

1. A blowing agent for a resinous material; the blowing agent consisting essentially of a blend of:
   (a) a flammable liquid hydrocarbon; and
   (b) a halogenated aliphatic hydrocarbon; and wherein the blowing agent has a boiling point of between about 30° C. to 100° C.

2. The blowing agent of claim 1 wherein the liquid hydrocarbon is present in an amount between about 5 percent and about 30 percent by weight of the blowing agent.

3. The blowing agent of claim 2 wherein the liquid hydrocarbon is selected from the group consisting of aliphatic, aromatic, and alicyclic hydrocarbons and mixtures thereof.

4. The blowing agent of claim 3 wherein the hydrocarbon is selected from the group consisting essentially of: n-pentane, 2-pentane, n-hexane, heptane, dimethylethylmethane, 2-methylpentane, 2,3-dimethylybutane, pentene-1, 2-methylbutene, 3-methylbutene, hexene-1, cyclopentane, cyclohexane, benzene, and mixtures thereof.

5. The blowing agent of claim 1 wherein the halogenated aliphatic hydrocarbon is selected from the group consisting of monohalogenated and polyhalogenated aliphatic hydrocarbons and mixtures thereof.

6. The blowing agent of claim 5 wherein the halogenated aliphatic hydrocarbon is present in an amount between about 70 percent and about 95 percent by weight based on total weight of the blowing agent.

7. The blowing agent of claim 6 wherein the monohalogenated compounds are selected from the group consisting of: n-propyl chloride, n-propyl bromide, ethyl iodide, isopropyl chloride, isobutyl chloride, t-butyl chloride and t-butyl bromide, and the polyhalogenated aliphatic hydrocarbon is selected from the group consisting of: methylene chloride, ethylene bromide, methylene bromide, chloroform, carbon tetrachloride, ethylene dichloride, s-dichloroacetylene, and trichloroethylene, and mixtures thereof.

8. In a process for making an isocyanate-based foam of the type wherein an organic polyisocyanate is catalytically reacted in the presence of a blowing agent the improvement which comprises: foaming the isocyanate with a blowing agent comprising: the blowing agent of claim 1.

9. The improvement of claim 8 wherein the blowing agent is present in an amount between about 1 and about 30 percent by weight of the total weight of the isocyanate.

10. The improvement of claim 9 wherein the liquid hydrocarbon is selected from the group consisting essentially of: aliphatic, aromatic and alicyclic hydrocarbons and mixtures thereof.

11. The improvement of claim 8 wherein the halogenated hydrocarbon is selected from the group consisting of monohalogenated and polyhalogenated aliphatic hydrocarbons and mixtures thereof.

12. The improvement of claim 11 wherein the halogenated aliphatic hydrocarbon is present in an amount between about 70 and about 95 percent by weight based on total weight of the blowing agent.

13. The process of claim 11 wherein the monohalogenated compounds are selected from the group consisting of: propyl chloride, propyl bromide, ethyl iodide, isopropyl chloride, isobutyl chloride, butyl chloride and butyl bromide, and the polyhalogenated aliphatic hydrocarbon is selected from the group consisting essentially of: methylene chloride, ethyl bromide, methylene bromide, chloroform, carbon tetrachloride, ethylene dichloride, s-dichloroacetylene, and trichloroethylene.

14. the improvement of claim 8 wherein the isocyanate-based foam is a polyurethane foam.

15. The improvement of claim 8 wherein the isocyanate-based foam is an isocyanurate foam.

16. The process of claim 14 wherein the blowing agent is present in an amount between about 1 to about 30 percent by weight based on total weight of the isocyanate.

17. The process of claim 16 wherein the blowing agent is present in an amount between about 1 to about 30 percent by weight of the isocyanate.

18. The blowing agent of claim 1 which further comprises:
   (a) a hydrogen containing chlorofluorocarbon, the hydrogen-containing chlorofluorocarbon being in admixture with the blend in an amount ranging from about 1 to 99 percent, by weight, of the blend and from about 99 percent to about 1 percent by weight of the hydrogen-containing chlorofluorocarbon, based on the total weight.

19. the blowing agent of claim 1 wherein the blowing agent further comprises:
(a) a chlorofluorocarbon, the blend and the chlorofluorocarbon being present in an amount ranging from about 1 to 95 percent, by weight, of the blend and from about 99 percent to about 1 percent, by weight, of the blend, based on the total weight of the blowing agent.

20. The blowing agent of claim 1 which further comprises, in admixture:
(a) a liquid chlorofluorocarbon having a boiling point between about 30° C. and about 100 ° C.,
(b) a liquid hydrogen-containing chlorofluorocarbon blowing agent having a boiling point of between about 30° C. and about 100° C., and wherein the blend is present in an amount of at least 1 percent by weight, based on the total weight of the admixture.

21. In a method for manufacturing an isocyanurate foam of the type wherein an organic polyisocyanate is catalytically reacted in the presence of a trimerization catalyst and a blowing agent, the improvement which comprises:
preparing the foam in the presence of a blowing agent comprising:
(a) the blend of claim 1 and
(b) a hydrogen-containing chlorofluorocarbon blowing agent having a boiling point of between about 30° C. and about 100° C., and wherein the blend is present in an amoun of at least 1 percent, by weight, based on the total weight of the blowing agent.

22. A blowing agent for a resinous material consisting of a blend of:
(a) a liquid hydrocarbon; and
(b) a halogenated aliphatic hydrocarbon; and wherein the blowing agent has a boiling point of between about 30° C. to 100° C.

23. The blowing agent of claim 22 wherein the liquid hydrocarbon is present in an amount between about 5 percent and about 30 percent by weight of the blowing agent.

24. The blowing agent of claim 22 wherein the halogenated aliphatic hydrocarbon is selected from the group consisting of monohalogenated and polyhalogenated aliphatic hydrocarbons and mixtures thereof.

25. The blowing agent of claim 22 wherein the halogenated aliphatic hydrocarbon is present in an amount between about 70 percent and about 95 percent by weight based on total weight of the blowing agent.

26. The blowing agent of claim 22 wherein the monohalogenated compounds are selected from the group consisting of: n-propyl chloride, n-propyl bromide, ethyl iodide, isopropyl chloride, isobutyl chloride, t-butyl chloride and t-butyl bromide, and the polyhalogenated aliphatic hydrocarbon is selected from the group consisting of: methylene chloride, ethylene bromide, methylene bromide, chloroform, carbon tetrachloride, ethylene dichloride, s-dichloroacetylene, and trichloroethylene, and mixtures thereof.

27. A blowing agent utilized for a resinous material, the blowing agent consisting of a blend of:
(a) a liquid hydrocarbon; and
(b) a halogenated aliphatic hydrocarbon; which is combined with a hydrogen-containing chlorofluorocarbon the hydrogen containing chlorofluorocarbon being in admixture with the blend in an amount ranging from about 1 to 99 percent, by weight, of the blend and from about 99 percent to about 1 percent by weight of the hydrogen-containing chlorofluorocarbon, based on the total weight.

28. The blowing agent of claim 27 wherein the blowing agent further comprises:
(a) a chlorofluorocarbon, the blend and the chlorofluorocarbon being present in an amount ranging from about 1 to 95 percent, by weight, of the blend and from about 99 percent to about 1 percent, by weight, of the blend, based on the total weight of the blowing agent.

29. The blowing agent of claim 27 which further comprises, in admixture;
(a) a liquid chlorofluorocarbon having a boiling point between about 30° C. and about 100° C.,
(b) a liquid hydrogen-containing chlorofluorocarbon blowing agent having a boiling point of between about 30° C. and about 100° C., and wherein the blend is present in an amoun of at least 1 percent by weight, based on the total weight of the admixture.

* * * * *